(12) United States Patent
Sayko et al.

(10) Patent No.: US 11,611,623 B2
(45) Date of Patent: Mar. 21, 2023

(54) TRUSTED SYSTEM FOR PROVIDING CUSTOMIZED CONTENT TO INTERNET SERVICE PROVIDER SUBSCRIBERS

(71) Applicant: AT&T Intellectual Property I, L.P., Atlanta, GA (US)

(72) Inventors: Robert Sayko, Colts Neck, NJ (US); Anestis Karasaridis, Jersey City, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/207,574

(22) Filed: Mar. 19, 2021

(65) Prior Publication Data

US 2022/0303343 A1    Sep. 22, 2022

(51) Int. Cl.
*H04L 67/146* (2022.01)
*H04L 67/306* (2022.01)
*H04L 61/4511* (2022.01)

(52) U.S. Cl.
CPC ........ *H04L 67/146* (2013.01); *H04L 61/4511* (2022.05); *H04L 67/306* (2013.01)

(58) Field of Classification Search
CPC ... H04L 67/146; H04L 67/306; H04L 61/1511
USPC ......................................................... 709/223
See application file for complete search history.

(56) References Cited

U.S. PATENT DOCUMENTS

| | | | |
|---|---|---|---|
| 6,353,849 B1 * | 3/2002 | Linsk ................. | G06F 16/9535 709/203 |
| 6,408,336 B1 | 6/2002 | Schneider et al. | |
| 7,909,245 B1 | 3/2011 | Chaskin et al. | |
| 7,962,571 B2 | 6/2011 | Yuan et al. | |
| 8,073,866 B2 | 12/2011 | Eagle et al. | |
| 8,131,261 B2 | 3/2012 | Roach, Jr. | |
| 8,312,273 B2 | 11/2012 | Nice et al. | |
| 8,332,930 B2 | 12/2012 | Burton | |

(Continued)

FOREIGN PATENT DOCUMENTS

| | | | |
|---|---|---|---|
| WO | 9840992 | 9/1998 | |
| WO | WO-0115405 A2 * | 3/2001 | ............ G06Q 30/02 |
| WO | 2007048251 A1 | 5/2007 | |

OTHER PUBLICATIONS

Zach Gollwitzer, Understanding IP addresses and Subnet Masks, Jan. 1, 2020, medium.com, https://zach-gollwitzer.medium.com/understanding-ip-addresses-and-subnet-masks-d3083396799f#:~:text=Most%20ISPs%20run%20DHCP%20servers,assign%20to%20a%20new%20customer! (Year: 2020).*

(Continued)

*Primary Examiner* — Zi Ye (57) ABSTRACT

A method includes receiving, by a processing system of a user endpoint device, a network cookie directly from an internet service provider who provides a subscriber who is associated with the user endpoint device with connectivity to the internet, storing, by the processing system, the network cookie in a local memory of the user endpoint device, generating, by the processing system, a request to send to the Internet service provider, wherein the request comprises a request for an internet protocol address associated with a uniform resource locator of an internet content provider, attaching, by the processing system, the network cookie to the request, and sending, by the processing system, the request including the network cookie to the Internet service provider.

20 Claims, 5 Drawing Sheets

(56) References Cited

U.S. PATENT DOCUMENTS

| | | |
|---|---|---|
| 8,504,704 B2 | 8/2013 | Hardt |
| 8,769,621 B2 | 7/2014 | Wechsler |
| 9,021,604 B2 | 4/2015 | Nicolas |
| 9,603,022 B2 | 3/2017 | Laarakkers |
| 9,607,324 B1 | 3/2017 | Reed |
| 9,819,491 B2 | 11/2017 | Garcia |
| 9,840,992 B2 | 12/2017 | Duncan |
| 10,599,628 B2 | 3/2020 | Ali |
| 2001/0034638 A1* | 10/2001 | Kelley ............... G06Q 30/0201 705/7.29 |
| 2004/0034799 A1 | 2/2004 | Mikami |
| 2004/0143667 A1* | 7/2004 | Jerome ................. G06Q 30/02 709/228 |
| 2006/0282660 A1 | 12/2006 | Varghese et al. |
| 2007/0048251 A1 | 3/2007 | Arthur |
| 2008/0281706 A1 | 11/2008 | Sullivan |
| 2011/0047609 A1* | 2/2011 | Tetsuhashi .......... H04W 12/069 726/7 |
| 2013/0061288 A1 | 3/2013 | Paim |
| 2013/0212188 A1 | 8/2013 | Duterque et al. |
| 2014/0150116 A1 | 5/2014 | Edwards |
| 2014/0310395 A1 | 10/2014 | Chakra et al. |
| 2018/0121934 A1 | 5/2018 | Agarwal et al. |
| 2018/0357439 A1 | 12/2018 | Osotio |
| 2019/0354709 A1 | 11/2019 | Brinskelle |
| 2020/0160383 A1 | 5/2020 | Bitoun et al. |
| 2021/0097582 A1 | 4/2021 | Wang et al. |
| 2021/0112049 A1 | 4/2021 | Yigit et al. |

OTHER PUBLICATIONS

U.S. Appl. No. 16/884,650, filed May 27, 2020, not yet published.

* cited by examiner

TRUSTED SYSTEM FOR PROVIDING CUSTOMIZED CONTENT TO INTERNET SERVICE PROVIDER SUBSCRIBERS

The present disclosure relates generally to data privacy, and relates more particularly to devices, non-transitory computer-readable media, and methods for providing subscribers of an Internet service provider with customized content via a trusted system.

BACKGROUND

Many websites capture data from users who visit the websites. Typically, the websites may use algorithms and other mechanisms that estimate the user's intentions or preferences based on the user's search history, cookies, and/or user provided data. For instance, a search engine website may capture a search (e.g., a string of keywords) executed by a user and associate the search with the user's Internet Protocol (IP) address. Other websites may include embedded scripts that capture the user's data when the website is loaded on the user's user endpoint device. Still other websites may use cookies in order to remember stateful information and/or to record user browsing history.

SUMMARY

The present disclosure broadly discloses methods, computer-readable media, and systems for providing subscribers of an Internet service provider with customized content via a trusted system. In one example, a method performed by a processing system of a user endpoint device including at least one processor includes receiving a network cookie directly from an internet service provider who provides a subscriber who is associated with the user endpoint device with connectivity to the internet, storing, by the processing system, the network cookie in a local memory of the user endpoint device, generating, by the processing system, a request to send to the Internet service provider, wherein the request comprises a request for an internet protocol address associated with a uniform resource locator of an internet content provider, attaching, by the processing system, the network cookie to the request, and sending, by the processing system, the request including the network cookie to the Internet service provider.

In another example, a non-transitory computer-readable medium may store instructions which, when executed by a processing system in a communications network, cause the processing system to perform operations. The operations may include receiving, by a user endpoint device, a network cookie directly from an internet service provider who provides a subscriber who is associated with the user endpoint device with connectivity to the internet, storing, by the processing system, the network cookie in a local memory of the user endpoint device, generating, by the processing system, a request to send to the Internet service provider, wherein the request comprises a request for an internet protocol address associated with a uniform resource locator of an internet content provider, attaching, by the processing system, the network cookie to the request, and sending, by the processing system, the request including the network cookie to the Internet service provider.

In another example, a device may include a processing system including at least one processor and a non-transitory computer-readable medium storing instructions which, when executed by the processing system when deployed in a communications network, cause the processing system to perform operations. The operations may include receiving, by a user endpoint device, a network cookie directly from an internet service provider who provides a subscriber who is associated with the user endpoint device with connectivity to the internet, storing, by the processing system, the network cookie in a local memory of the user endpoint device, generating, by the processing system, a request to send to the Internet service provider, wherein the request comprises a request for an internet protocol address associated with a uniform resource locator of an internet content provider, attaching, by the processing system, the network cookie to the request, and sending, by the processing system, the request including the network cookie to the Internet service provider.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and systems for providing subscribers of an Internet service provider with customized content via a trusted system. As discussed above, many websites capture data from users who visit the websites. Typically, the websites may use algorithms and other mechanisms that estimate the user's intentions or preferences based on the user's search history, cookies, and/or user provided data. For instance, a search engine website may capture a search (e.g., a string of keywords) executed by a user and associate the search with the user's Internet Protocol (IP) address. Other websites may include embedded scripts that capture the user's data when the website is loaded on the user's user endpoint device. Still other websites may use cookies in order to remember stateful information and/or to record user browsing history. Encrypted session cookies may be used, for instance, to remember the items that a user has added to an online shopping cart, to record the websites that the user has visited, or to determine when a user is logged into a website that requires a login, among other uses. These encrypted session cookies typically expire once the users are no longer browsing on the websites that sent the cookies. Thus, cookies can be very useful tools for Internet content providers and can provide a measure of convenience to users.

These approaches for capturing user data often balance the Internet content providers' need to collect the most comprehensive user data against the users' desire for privacy. For instance, although a user's search history may be willingly provided by a user, the search history may not provide the most complete view of the user's intentions and interests. If the user enters a website's uniform resource locator (URL) directly into the web browser's address bar, as opposed to searching for the website through a search engine, then that website (which the user actually visited) will not appear in the user's search history.

On the other hand, although scripts and cookies track the websites that a user actually visits, many users view these mechanisms as intrusive. For instance, user backlash has been growing against persistent (long-lived or non-expiring) and third-party cookies that track users' histories and browsing behaviors even after the users have stopped browsing on the websites that sent the cookies. Storage of these more persistent cookies is often viewed by users as an invasion of privacy. Moreover, storage of these more persistent cookies often happens in the background of the computing devices, such that the users are not even aware that the cookies are being stored and accumulated. As such, measures have been taken to limit the use of many kinds of cookies. For instance, the European Union has passed a law that forces all Internet content providers to obtain explicit user consent before sending non-essential cookies to users' computing devices. Many web browsers also offer users the option to block cookies. These measures may greatly disrupt the browsing experience for users (e.g., users may constantly be asked for permission to send cookies or to unblock cookies), as well make it harder for Internet content providers to customize content or provide rich content services over the Internet.

Examples of the present disclosure, in essence, replace the use of conventional cookies generated by Internet content providers (or other third parties) with cookies that are generated by the Internet service provider. This system provides improved protection of user data, without disrupting the user's browsing experience or preventing trusted Internet content providers from providing customized content to users. In particular, examples of the present disclosure leverage the unique, trusted relationship that Internet service providers have both with their subscribers (e.g., end users who do not want cookies from unknown parties stored on their computing devices) and with trusted Internet content providers (who need to know information about the end users).

With the advent of Carrier Grade Network Address Translation (CG-NAT), which many Internet service providers are deploying to conserve Internet Protocol version 4 (IPv4) address space, the uniqueness of an end user's IP address to Internet Content Providers has become a thing of the past. However, the Internet service providers still know the links between the IP addresses and the end users (or end user households, in the case of wireline Internet access), as the Internet service providers maintain accounts for the end users. Thus, in one example of the present disclosure, an Internet service provider becomes an intermediary between the end users and the Internet content providers.

In one particular example, an Internet service provider may maintain a subscriber database that contains, for each of the Internet service provider's subscribers, a profile. The profile for a subscriber may contain at least some of the data for the subscriber that would normally be stored in a cookie. Additionally, the Internet service provider may track DNS activity of (e.g., the websites that are visited by) the subscriber, and may generate a cookie (referred to herein as a "network cookie") based on the DNS activity that may be stored in the subscriber's user endpoint device. The network cookie can be used to customize content that the subscriber receives later, e.g., when visiting websites associated with Internet content providers. However, because the network cookie is generated by the Internet service provider (i.e., a trusted entity to the subscriber) rather than the Internet content provider(s) (i.e., potentially unknown or untrusted entities to the subscriber), the subscriber may be more willing to have the network cookie stored on the user endpoint device.

Moreover, by basing the network cookie on the subscriber's DNS activity, such as the websites actually visited by the subscriber, as opposed to the subscriber's search data (e.g., keywords entered in a web browser), the resultant network cookie is more relevant to the subscriber's actual intentions and preferences. The relevance may be further improved by incorporating profile data, which the subscriber may provide to the Internet service provider upon subscribing to the Internet service provider's services and which is already in the possession of the Internet service provider as discussed above. Thus, timelier and more relevant information may be presented to the subscriber, which makes for a better experience for the subscriber and, ideally, a better result for the Internet content providers.

Within the context of the present disclosure, an "Internet service provider" is understood to refer to an entity that provides its subscribers with services for accessing and using the Internet. An "Internet content provider" is understood to refer to an entity that provides content (e.g., a shopping website, a corporate website, an education website, a video conferencing website, a news website, a social media website, or the like) to users over the Internet. A "trusted" Internet content provider is an Internet content provider that has been vetted in some way such that the Internet content provider has been pre-authorized to receive user data. These and other aspects of the present disclosure are discussed in greater detail below in connection with the examples of FIGS. 1-5.

Figure 1:
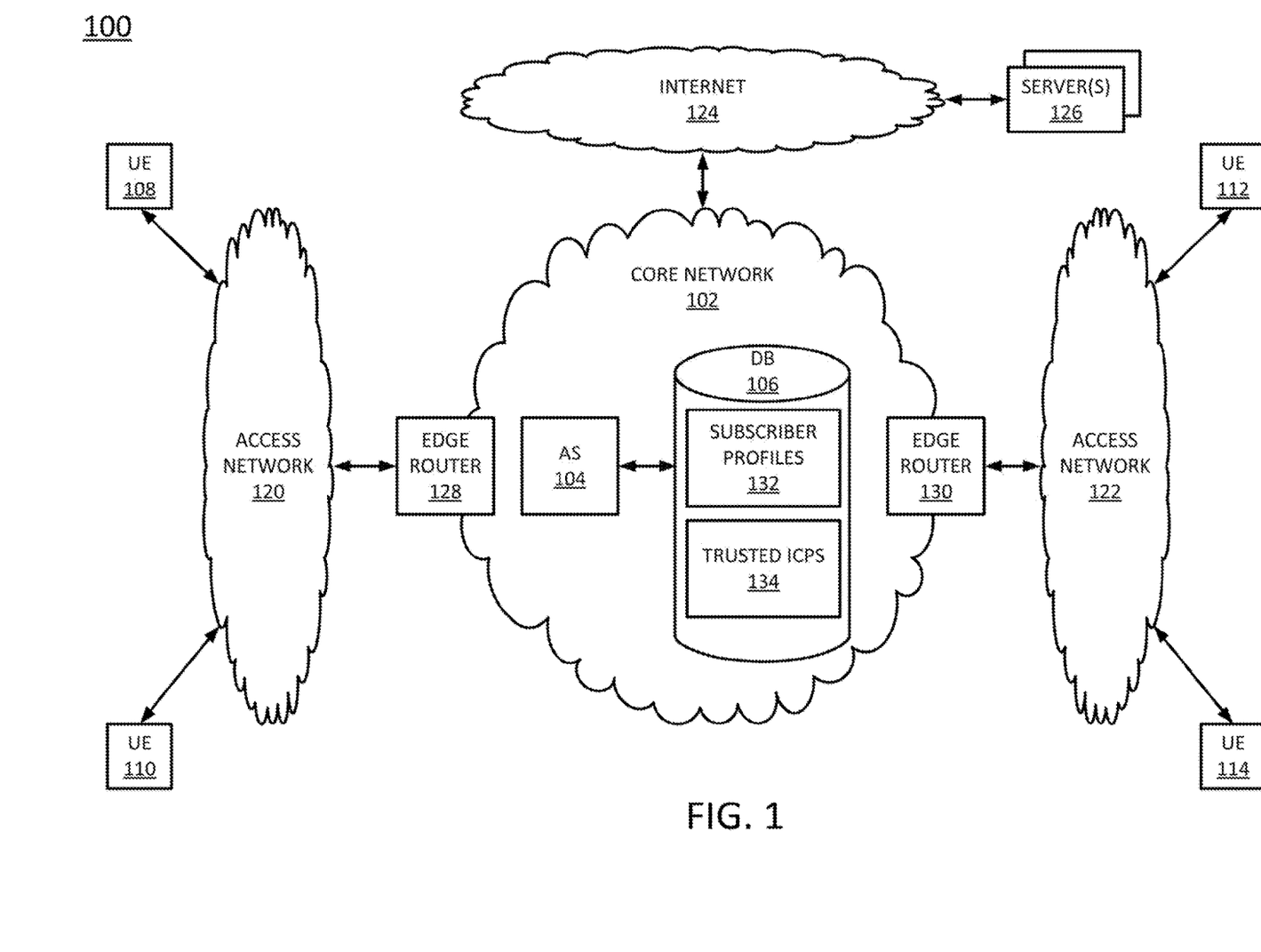
FIG. 1 illustrates an example system in which examples of the present disclosure for providing subscribers of an Internet service provider with customized content via a trusted system may operate.

To further aid in understanding the present disclosure, FIG. 1 illustrates an example system 100 in which examples of the present disclosure for providing subscribers of an Internet service provider with customized content via a trusted system may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS)

network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3rd party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 500 depicted in FIG. 5, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like.

In one example, one or more servers 126 may be accessible to user endpoint devices 108, 110, 112, and 114 via Internet 124 in general. The server(s) 126 may be associated with Internet content providers, e.g., entities that provide content (e.g., news, blogs, videos, music, files, products, services, or the like) in the form of websites to users over the Internet 124. Thus, some of the servers 126 may comprise content servers, e.g., servers that store content such as images, text, video, and the like which may be served to web browser applications executing on the user endpoint devices 108, 110, 112, and 114 in the form of websites.

Figure 5:
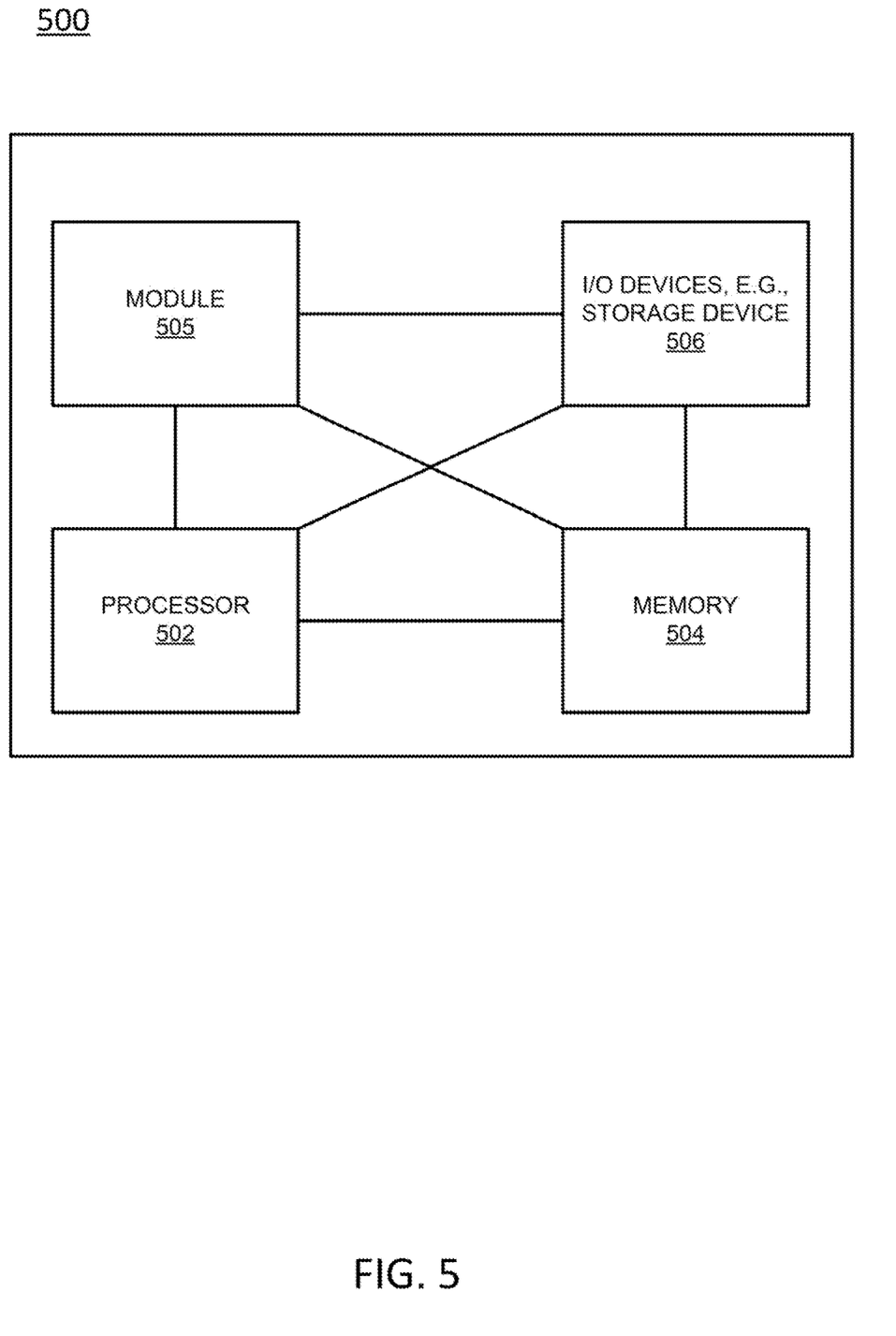
FIG. 5 illustrates an example of a computing device, or computing system, specifically programmed to perform the steps, functions, blocks, and/or operations described herein.

In accordance with the present disclosure, the AS 104 may be configured to provide one or more operations or functions in connection with examples of the present disclosure for providing subscribers of an Internet service provider with customized content via a trusted system, as described herein. The AS 104 may comprise one or more physical devices, e.g., one or more computing systems or servers, such as computing system 500 depicted in FIG. 5, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

In one example, the AS 104 may be configured to receive requests from subscribers associated with the user endpoint devices 108, 110, 112, and 114, where the requests comprise requests for IP addresses associated with URLs of websites (which may be served by Internet content providers via the servers 126). Thus, the AS 104 may operate, in part, as a DNS resolver which receive requests from the user endpoint devices 108, 110, 112, and 114 to translate domain names (e.g., examplebank.com) into IP addresses (e.g., 123.456.789.123) with which the user endpoint devices 108, 110, 112, and 114 may connect to desired websites.

However, AS 104 may also be further configured to perform analytics on the requests received from a given user endpoint device 108, 110, 112, and 114 in order to extract or infer an intention or preference of the subscriber who is operating the given user endpoint device 108, 110, 112, and 114. For instance, the AS 104 may utilize machine learning techniques in order to extract patterns from the requests originating with the given user endpoint device 108, 110, 112, or 114. The pattern (e.g., subscriber intention or preference) may be encoded in a network cookie, which may be returned to the user endpoint device 108, 110, 112, and 114 along with a requested IP address. The user endpoint device 108, 110, 112, and 114 may store the network cookie locally and include the network cookie in any subsequent requests to the AS 104, as described in further detail below.

The AS 104 may augment the network cookie with information stored in the DB 106. For instance, the DB 106 may store subscriber (user) profiles 132 for subscribers of the Internet service provider which operates the core network 102. In a further example, the DB 106 may additionally store a list of trusted Internet content providers (ICPs) 134 which have been vetted (e.g., by the Internet service provider or by a third party).

In one example, each subscriber profile may store, for an associated subscriber, a set of data that may commonly be stored in conventional cookies. For instance, the subscriber profile may include at least one of the following types of data: subscriber name, subscriber identifier (e.g., a numerical or alphanumeric identifier that does not identify the subscriber by name, such as an account number), subscriber address (e.g., the physical address associated with the subscriber account, which may be a home address, a business address, or the like), a mobile device number associated with the subscriber (e.g., if the Internet service provider also provides mobile phone services), a location of the subscriber (e.g., a current location, if the Internet service provider has access to information about the subscriber's mobile device (s)), a DNS query history of the subscriber, demographic information of the subscriber (e.g., age, marital status, employment status, education level, language preference, etc.), and/or other information that the subscriber may be willing to divulge to trusted Internet content providers in order to improve content customization (i.e., having received affirmed subscriber consent or having a subscriber opting into a service that allows such subscriber information to be stored and used). Thus, in one embodiment, subscriber consent is received prior to the use such subscriber information to improve the content customization for the subscriber.

In one example, the subscriber profiles 132 are stored in encrypted form in the DB 106 to protect subscriber privacy. Subscribers may have the option for the profiles to be provided to the trusted Internet content providers.

In a further example, the subscriber profile associated with a subscriber may also include a list of Internet content providers which the subscriber considers trusted and/or untrusted. That is, the subscriber profile may identify a limited list of Internet content providers with whom the subscriber's data may be shared, and/or a limited list of Internet content providers with whom the subscriber's data may not be shared. In a further example, the subscriber profile may identify specific subsets of the subscriber data that may or may not be stored with specific Internet content providers or types of Internet content providers. For instance, the subscriber profile may authorize information about a subscriber's DNS query history, but not location, to be shared with Internet content providers which provide social media services. The same subscriber profile may authorize both DNS query history and location data to be provided to Internet content providers which provide search engines (or to be provided to specific search engines). The subscriber profile may authorize identification information in the subscriber profile to be shared with a specific financial institution with which the subscriber has an account (e.g., examplebank.com). Thus, a first subset of the subscriber data that is allowed to be shared with a first Internet content provider (or type of Internet content provider) may differ from a second subset of the subscriber data that is allowed to be shared with a second Internet content provider (or second type of Internet content provider).

A subscriber can always decide to opt out of having their subscriber profiles 132 stored in the DB 106 for the purposes of sharing with Internet content providers. However, if a subscriber opts out of storing a subscriber profile, the subscriber will likely have to either: (1) accept cookies (which may, if done by default, result in untrusted Internet content providers obtaining sensitive information) or (2) block cookies (and not receive a content-rich, customized browsing experience, which may or may not be a concern for some subscribers).

The list of trusted Internet content providers 134 may comprise a list of Internet content providers that have been vetted, such that the AS 104 has been pre-authorized to share information in the subscriber profiles 132 with the Internet content providers which are included in the list of trusted Internet content providers 134. In one example, in order to be included in the list of trusted Internet content providers 134, an Internet content provider may be vetted by some third party who is not a subscriber or the Internet service provider who operates the core network 102. For instance, an Internet content provider may be approved for inclusion in the list of trusted Internet content providers 134 based on a rating of the Internet content provider in an industry database and/or on a domain reputation of the Internet content provider. In another example, a subscriber may provide a list of Internet content providers which he or she trusts, as discussed above.

In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for sharing user data with Internet content providers via a trusted system, as described herein. Example methods for providing subscribers of an Internet service provider with customized content via a trusted system are described in greater detail below in connection with FIGS. 2-3.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
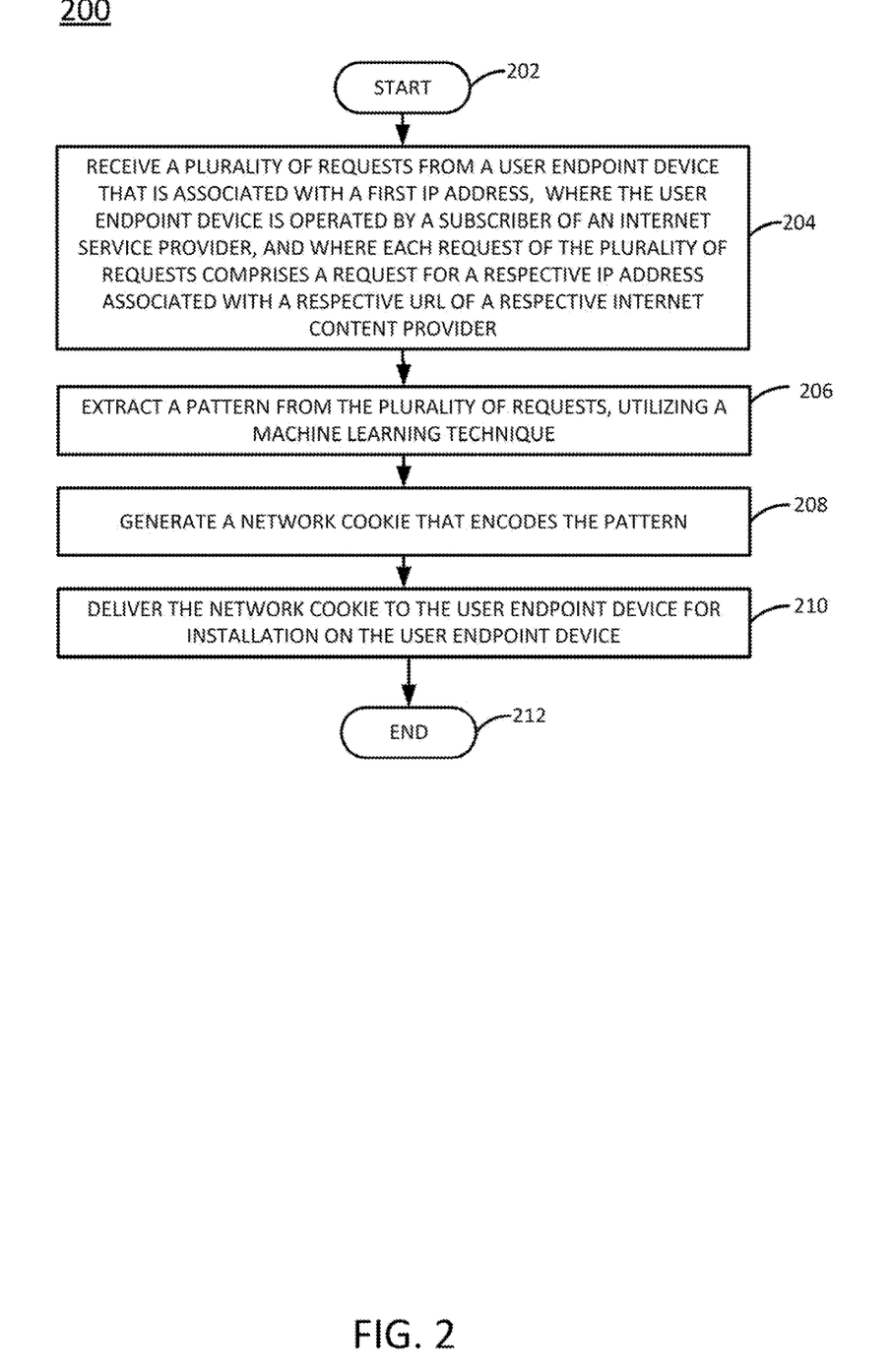
FIG. 2 illustrates a flowchart of an example method for providing subscribers of an Internet service provider with customized content via a trusted system, in accordance with the present disclosure.

FIG. 2 illustrates a flowchart of an example method 200 for providing subscribers of an Internet service provider with customized content via a trusted system, in accordance with the present disclosure. In one example, steps, functions and/or operations of the method 200 may be performed by a device as illustrated in FIG. 1, e.g., AS 104 or any one or more components thereof. In particular, the method 200 provides a method by which an Internet service provider may generate a network cookie for installation on a subscriber's user endpoint device.

In one example, the steps, functions, or operations of method 200 may be performed by a computing device or system 500, and/or a processing system 502 as described in connection with FIG. 5 below. For instance, the computing device 500 may represent at least a portion of the AS 104 in accordance with the present disclosure. For illustrative purposes, the method 200 is described in greater detail below in connection with an example performed by a processing system in an Internet service provider network, such as processing system 502.

The method 200 begins in step 202 and proceeds to step 204. In step 204, the processing system may receive a plurality of requests (i.e., at least a first request and a second request) from a user endpoint device that is associated with a first IP address, where the user endpoint device is operated by a subscriber of an Internet service provider, and where each request of the plurality of requests comprises a request for a respective IP address associated with a respective URL of a respective Internet content provider. For instance, the plurality of requests may comprise domain name system (DNS) or DNS over hypertext transfer protocol (DoH) requests, where the processing system is part of a DNS or DoH server operated by the Internet service provider to resolve requests for IP addresses associated with URLs. Thus, the subscriber of the Internet service provider may have provided a URL associated with a request by typing the URL into an address bar of a web browser or by clicking on a hyperlink (e.g., where the hyperlink may have been presented to the subscriber in response to a search initiated by the subscriber).

In step 206, the processing system may extract a pattern from the plurality of requests, utilizing a machine learning technique. For instance, in addition to responding to the plurality of requests (e.g., by returning the IP addresses associated with the URLs specified in the requests), the processing system may also apply one or more machine learning techniques to the plurality of requests in order to derive a commonality or a pattern among the plurality of requests that may indicate a subscriber intent or interest. The pattern may be derived, for example, by analyzing the websites visited by the subscriber, the time the subscriber spent on each of the websites, the order in which the subscriber visited the websites, any content on the websites with which the subscriber interacted, and/or other activity related to the plurality of requests. For instance, if the plurality of requests includes a plurality of URLs for a plurality of different luxury car companies, the processing system may determine that the user may be interested in purchasing a luxury car. The machine learning technique may include one or more of the following techniques: a support vector machine (SVM), a decision tree technique, a random forest technique, or another technique.

In step 208, the processing system may generate a network cookie (i.e., a file) that encodes the pattern that is extracted in step 206. In another example, rather than directly encoding the pattern, the network cookie may instead include a reference or pointer to the analysis that extracted the pattern (where the details of the analysis may be stored in a location that is accessible to the processing system, such as local memory or a remote database).

In one example, the network cookie may also include additional information about the subscriber, which may be retrieved from a subscriber profile. For instance, the processing system may retrieve the first IP address from the plurality of requests and may match the first IP address to a subscriber for whom the Internet service provider maintains a profile. In one example, the first IP address is a public IP address that is replaced with a private IP address on the subscriber's user endpoint device (e.g., in accordance with carrier grade network address translation). In one example, the public IP address is an IPv4 or IPv6 address that is not unique to the subscriber's user endpoint device. In other words, multiple subscriber networks including a network that includes the subscriber's user endpoint device may share a common public IP address. However, the processing system may know the private IP address with which the public IP address is replaced on the subscriber's user endpoint device. In other examples, the first IP address may be a public IP address that is unique to the subscriber's user endpoint device. Even when the subscriber's IP address changes (e.g., due to relocation, or a dynamic host configuration protocol re-assignment), the Internet service provider will still be able to use the network cookie to map the profile data associated with the old IP address to the new IP address (for instance, when the network cookie is received from the new IP address along with a DNS request, the information in the network cookie may operate as an identifier for the subscriber).

Non-unique public IP addresses related to NAT functions may be more commonly used in enterprise-initiated queries. For instance, an enterprise may utilize the disclosed system to ensure that cookies are not stored on the enterprise's networked computing devices. The enterprise may also establish profiles for the enterprise's employees which may restrict the employees' Internet usage or may enforce other policies related to Internet usage.

In one example, the additional information about the subscriber may include subscriber-provided data (e.g., data provided directly by the subscriber when the subscriber initially created an account with the Internet service provider) and/or information about the subscriber's network activity (e.g., data recorded by the Internet service provider in the course of providing service to the subscriber, such as current physical location, current network connectivity conditions, and the like). For instance, in one example, the additional information about the subscriber may include at least one of: subscriber name, subscriber identifier (e.g., a numerical or alphanumeric identifier that does not identify the subscriber by name, such as an account number), subscriber address (e.g., the physical address associated with the subscriber account, such as a home address, a business address, or the like), a mobile device number associated with the subscriber (e.g., if the Internet service provider also provides mobile phone services), a location of the subscriber (e.g., a current location, if the Internet service provider has access to information about the subscriber's mobile device (s)), a more extensive DNS query history of the subscriber, demographic information of the subscriber (e.g., age, marital status, employment status, education level, language preference, etc.), and/or other information about the subscriber. At least some of the additional data may comprise data that allows the Internet service provider to maintain stateful and/or persistent information about an HTTP session between the user endpoint device and an Internet content provider.

In a further example, the network cookie may also indicate which specific types of data the subscriber has authorized for sharing with which specific Internet content providers or types of Internet content providers. For instance, the profile may authorize information about a subscriber's DNS query history, but not location, to be shared with Internet content providers which provide social media services. The same profile may authorize both DNS query history and location data to be provided to Internet content providers which provide search engines (or to be provided to specific search engines). The profile may authorize identification information in the profile to be shared with a specific financial institution with which the subscriber has an account (e.g., examplebank.com). Authorization information may also be retrieved from a subscriber profile.

In step 210, the processing system may deliver the network cookie to the user endpoint device for installation on the user endpoint device. For instance, upon receiving the network cookie from the processing system, the user endpoint device may store the network cookie locally, e.g., in a local memory of the user endpoint device. When the user endpoint device sends any subsequent requests to the processing system (e.g., subsequent DNS or DoH requests), the user endpoint device may include the network cookie in the subsequent requests, as discussed in further detail below.

The method 200 may end in step 212.

Figure 3:
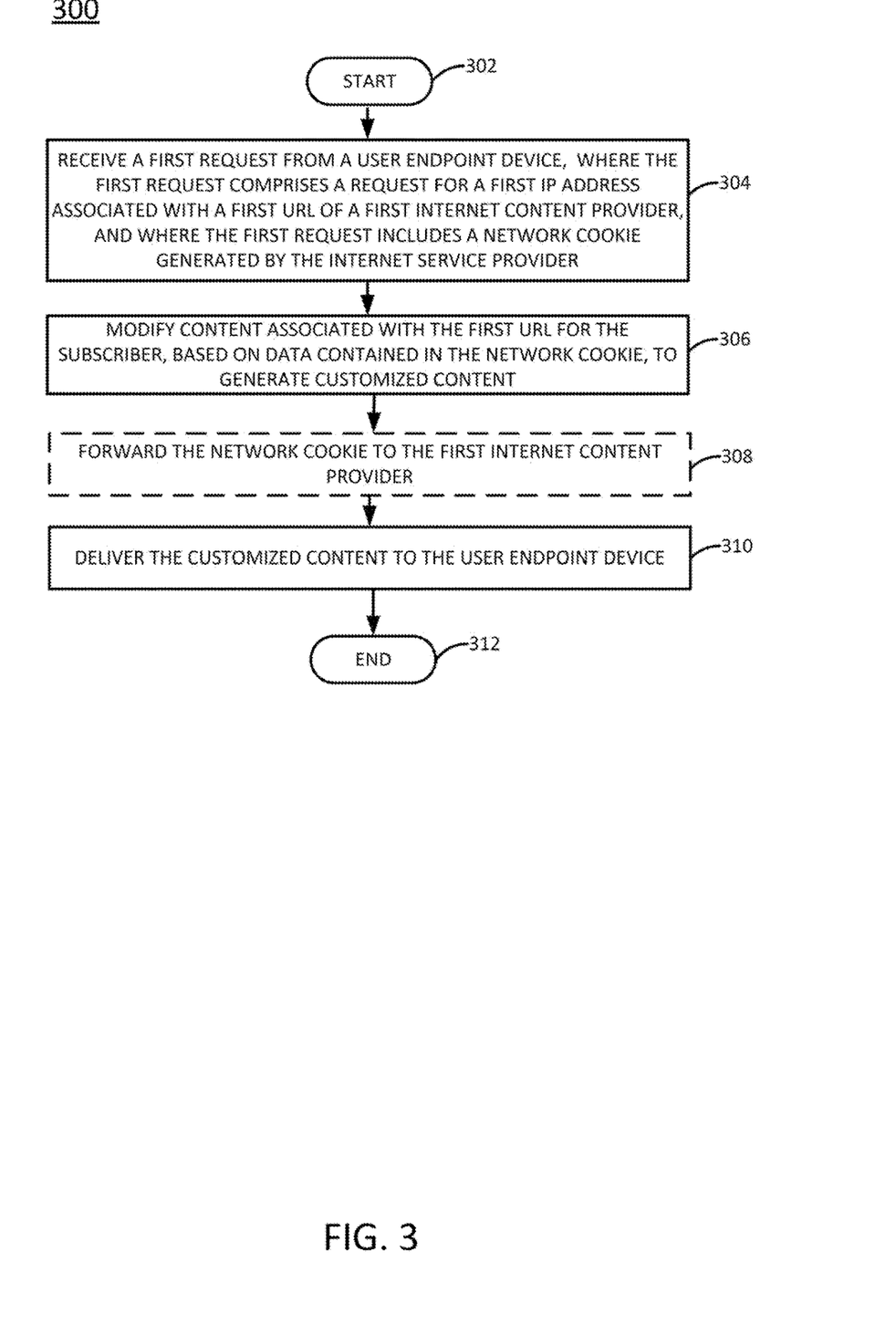
FIG. 3 illustrates a flowchart of an example method for providing subscribers of an Internet service provider with customized content via a trusted system, in accordance with the present disclosure.

FIG. 3 illustrates a flowchart of an example method 300 for providing subscribers of an Internet service provider with customized content via a trusted system, in accordance with the present disclosure. In particular, the method 300 provides a method for providing customized content to a user endpoint device of a subscriber when the user endpoint device has installed thereon a network cookie generated by the Internet service provider (as discussed in connection with the method 200, above). Thus, in one example, the method 300 may be viewed as an optional extension of the method 200, where the method 300 may pick up where the method 200 ends.

In one example, steps, functions and/or operations of the method 300 may be performed by a device as illustrated in FIG. 1, e.g., AS 104 or any one or more components thereof. In one example, the steps, functions, or operations of method 300 may be performed by a computing device or system 500, and/or a processing system 502 as described in connection with FIG. 5 below. For instance, the computing device 500 may represent at least a portion of the AS 104 in accordance with the present disclosure. For illustrative purposes, the method 300 is described in greater detail below in connection with an example performed by a processing system in an Internet service provider network, such as processing system 502.

The method 300 begins in step 302 and proceeds to step 304. In step 304, the processing system may receive a first request from a user endpoint device, where the first request comprises a request for a first IP address associated with a first URL of a first Internet content provider, and where the first request includes a network cookie that was generated by the Internet service provider (i.e., the service provider who provides the subscriber with connectivity to a core network and the Internet in general). In one example, the first request is separate from the plurality of requests received in step 204 of the method 200 (i.e., separate from the requests on which the network cookie was based). However, the first IP address may or may not be one of the IP addresses requested in the plurality of requests received in step 204. For instance, the subscriber may wish to revisit a previously visited website. Alternatively, the subscriber may wish to visit a website that the subscriber has not previously visited. Thus, the first Internet content provider could be, but is not necessarily, one of the Internet content providers who previously provided requested content to the subscriber.

In step 306, the processing system may modify content associated with the first URL for the subscriber, based on data contained in the network cookie included in the new request, to generate customized content for the subscriber. For instance, if the network cookie indicates that the subscriber has recently visited websites for a plurality of different luxury car manufacturers, and the first URL is associated with another luxury car manufacturer (or one of the luxury car manufacturers whose website the subscriber previously visited), then the content associated with the first URL may be modified to show a comparison between vehicles manufactured by the luxury car manufacturer associated with the first URL and the luxury car manufacturers associated with the previously visited websites (as indicated in the network cookie).

In another example, if the network cookie indicates that the subscriber is located in a particular city, then the content may be customized for the particular city. For instance, referring again to the subscriber who visited websites for a plurality of luxury car manufacturers, the content may be customized to show the nearest dealerships selling the luxury car brands whose websites the subscriber visited.

In another example, if the network cookie indicates that the subscriber's first language is Spanish, the processing system may obtain a Spanish language version of the website associated with the first URL. The above are examples in which the content of the website associated with the first URL may be customized for the subscriber based on the information contained in the network cookie; other customizations are also within the scope of the disclosure.

In optional step 308 (illustrated in phantom), the processing system may deliver the network cookie (e.g., a copy of the network cookie) to the first Internet content provider. This may enable the Internet content provider to continue to provide customized content to the user endpoint device. For instance, the network cookie may be used by the Internet content provider as an index into a database of subscriber profiles maintained by the Internet service provider or into a database of information maintained by the Internet content provider.

In one example, the processing system may only deliver the network cookie to the first Internet content provider if the subscriber has authorized sharing of the network cookie. For instance, the subscriber may authorize (e.g., in a profile maintained by the Internet service provider) the sharing of the network cookie with all Internet content providers, with only specific Internet content providers, with only specific types of Internet content providers, with only Internet content providers that have been vetted and determined to be trusted (e.g., by the Internet service provider or by a third party), or may not authorize the sharing of the network cookie with any Internet content providers at all.

In step 310, the processing system may deliver the customized content to the user endpoint device.

The method 300 may end in step 312.

Figure 4:
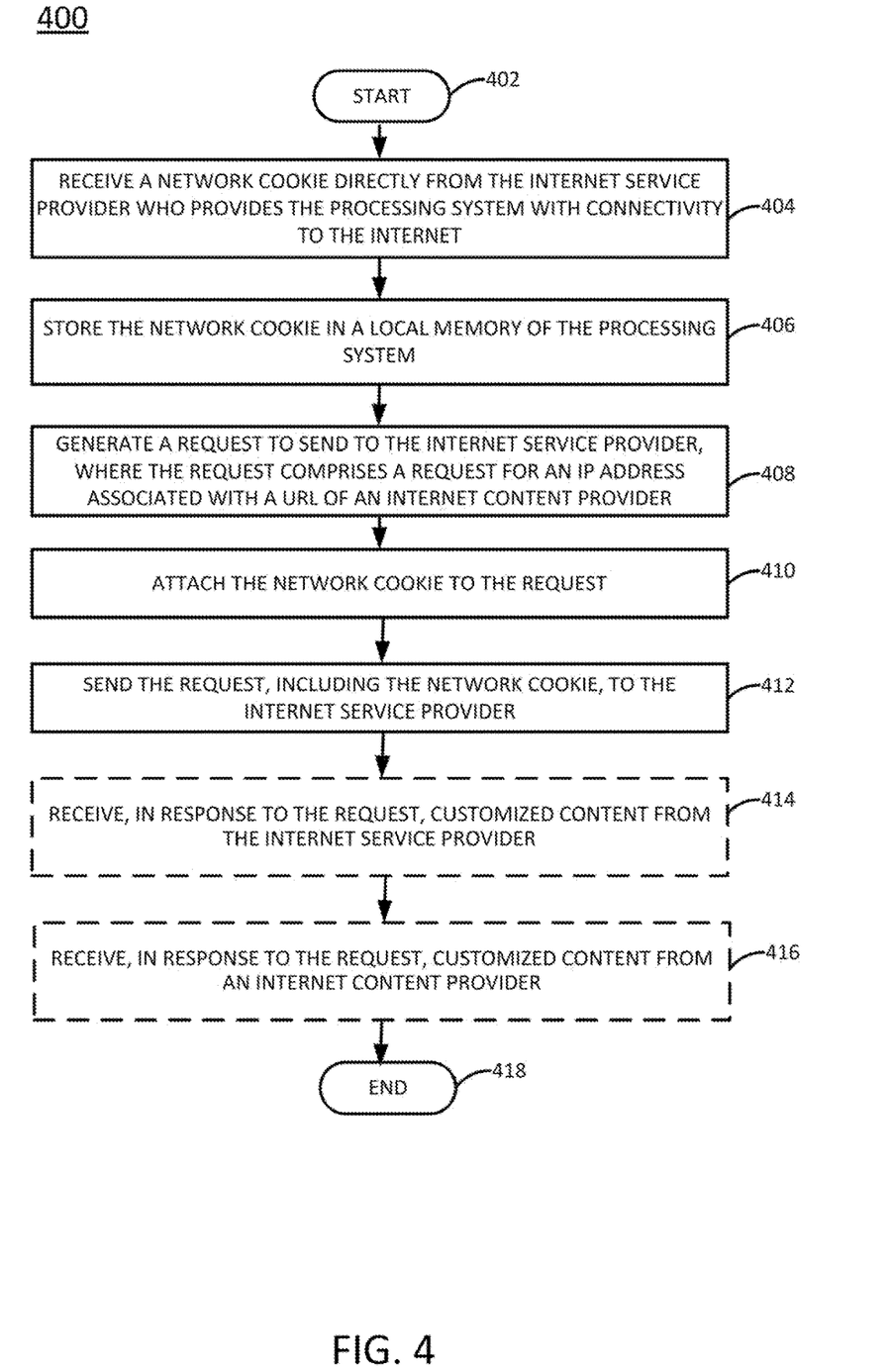
FIG. 4 illustrates a flowchart of an example method for providing subscribers of an Internet service provider with customized content via a trusted system, in accordance with the present disclosure.

FIG. 4 illustrates a flowchart of an example method 400 for providing subscribers of an Internet service provider with customized content via a trusted system, in accordance with the present disclosure. In particular, the method 400 provides a method for a user endpoint device of a subscriber, which has installed thereon a network cookie generated by the Internet service provider (as discussed in connection with the method 200, above), to obtain customized content using the network cookie. Thus, the method 400 may be viewed as the user-side process corresponding to the methods described in connection with FIGS. 2 and 3.

In one example, steps, functions and/or operations of the method 400 may be performed by a device as illustrated in FIG. 1, e.g., any one or more of user endpoint devices 108, 110, 112, and/or 114 or any one or more components thereof. In one example, the steps, functions, or operations of method 400 may be performed by a computing device or system 500, and/or a processing system 502 as described in connection with FIG. 5 below. For instance, the computing device 500 may represent at least a portion of a user endpoint device 108, 110, 112, or 114 in accordance with the present disclosure. For illustrative purposes, the method 400 is described in greater detail below in connection with an example performed by a processing system in an Internet service provider network, such as processing system 502.

The method 400 begins in step 402 and proceeds to step 404. In step 404, the processing system may receive a network cookie directly from the Internet service provider who provides the processing system with connectivity to the Internet. In one example, the network cookie may be received along with the response to a DNS request that the processing system sent to a DNS resolver of the Internet service provider. For instance, the network cookie may be received along with the IP address of an Internet content provider whose URL the processing system has provided to the DNS resolver for resolution.

In one example, the network cookie may encode a pattern that is extracted from a plurality of previous DNS requests sent by the processing system to the DNS resolver. In another example, rather than directly encoding the pattern, the network cookie may instead include a reference or pointer to the analysis that extracted the pattern. Additionally, the network cookie may include additional information about the subscriber associated with the processing system.

The addition information may include subscriber-provided data (e.g., data provided directly by the subscriber when the subscriber initially created an account with the Internet service provider) and/or information about the subscriber's network activity (e.g., data recorded by the Internet service provider in the course of providing service to the subscriber, such as current physical location, current network connectivity conditions, and the like). For instance, in one example, the additional information about the subscriber may include at least one of: subscriber name, subscriber identifier (e.g., a numerical or alphanumeric identifier that does not identify the subscriber by name, such as an account number), subscriber address (e.g., the physical address associated with the subscriber account, such as a home address, a business address, or the like), a mobile device number associated with the subscriber (e.g., if the Internet service provider also provides mobile phone services), a location of the subscriber (e.g., a current location, if the Internet service provider has access to information about the subscriber's mobile device(s)), a more extensive DNS query history of the subscriber, demographic information of the subscriber (e.g., age, marital status, employment status, education level, language preference, etc.), and/or other information about the subscriber. At least some of the additional data may comprise data that allows the Internet service provider to maintain stateful and/or persistent information about an HTTP session between the user endpoint device and an Internet content provider.

In a further example, the network cookie may also indicate which specific types of data the subscriber has authorized for sharing with which specific Internet content providers or types of Internet content providers. For instance, the profile may authorize information about a subscriber's DNS query history, but not location, to be shared with Internet content providers which provide social media services. The same profile may authorize both DNS query history and location data to be provided to Internet content providers which provide search engines (or to be provided to specific search engines). The profile may authorize identification information in the profile to be shared with a specific financial institution with which the subscriber has an account (e.g., examplebank.com).

In step 406, the processing system may store the network cookie in a local memory of the processing system. For instance, the processing system may store the network cookie in a folder or subfolder of the processing system's web browser application.

In step 408, the processing system may generate a request to send to the Internet service provider, where the request comprises a request for an IP address associated with a URL of an Internet content provider. For instance, the request may be generated in a web browser application of the processing system. As an example, a subscriber who is operating the processing system may type a URL into an address bar of the web browser application, or may click on a URL presented by the web browser application. In response, the processing system may generate a request containing the URL that is typed or clicked for delivery to a DNS resolver of the Internet service provider.

In step 410, the processing system may attach the network cookie to the request. For instance, the processing system may retrieve the network cookie from a folder or subfolder of the web browser application and may attach the network cookie to the request that was generated in step 408.

In step 412, the processing system may send the request that was generated in step 408, including the network cookie that was attached in step 410, to the Internet service provider. For instance, the processing system may send the request to a DNS resolver of the Internet service provider.

In optional step 414 (illustrated in phantom), the processing system may receive, in response to the request, customized content from the Internet service provider. The customized content may be customized based on information contained in the network cookie. For instance, if the network cookie indicates that the subscriber has recently visited websites for a plurality of different luxury car manufacturers, and the first URL is associated with another luxury car manufacturer (or one of the luxury car manufacturers whose website the subscriber previously visited), then the content associated with the first URL may be modified to show a comparison between vehicles manufactured by the luxury car manufacturer associated with the first URL and the luxury car manufacturers associated with the previously visited websites (as indicated in the network cookie).

In another example, if the network cookie indicates that the subscriber is located in a particular city, then the content may be customized for the particular city. For instance, referring again to the subscriber who visited websites for a plurality of luxury car manufacturers, the content may be customized to show the nearest dealerships selling the luxury car brands whose websites the subscriber visited.

In another example, if the network cookie indicates that the subscriber's first language is Spanish, the processing system may obtain a Spanish language version of the website associated with the first URL. The above are examples in which the content of the website associated with the first URL may be customized for the subscriber based on the information contained in the network cookie; other customizations are also within the scope of the disclosure.

In optional step 416 (illustrated in phantom), the processing system may receive, in response to the request, customized content from an Internet content provider. The Internet content provider may be an Internet content provider whose IP address corresponds to the URL included in the request sent in step 412. In this case, the Internet content provider may subscribe to an analytics service offered by the Internet service provider or may be included in a list of Internet content providers who have been authorized (by the Internet service provider and/or by the subscriber who is operating the processing system) to receive data about the subscriber who is operating the processing system. As a subscriber or vetted Internet content provider, the Internet service provider may have provided the network cookie that was attached to the request to the Internet content provider, so that the Internet content provider can provide customized content to the subscriber.

The method 400 may end in step 418.

Thus examples of the present disclosure, in essence, replace the use of conventional cookies generated by Internet content providers (or other third parties) with cookies that are generated by the Internet service provider. This system provides improved protection of user data, without disrupting the user's browsing experience or preventing trusted Internet content providers from providing customized content to users. In particular, examples of the present disclosure leverage the unique, trusted relationship that Internet service providers have both with their subscribers (e.g., end users who do not want cookies from unknown parties stored on their computing devices) and with trusted Internet content providers (who need to know information about the end users).

The network cookie may be updated, e.g., continuously, periodically, or in response to predefined triggering events. For instance, as the Internet service provider acquires more information about a subscriber's network activity (e.g., DNS history), the machine learning models used to extract the patterns may be able to produce improved results that align more closely with the subscriber's intentions and preferences. In one example, the network cookie may be updated (e.g., by re-running the machine learning models and including the more recent DNS history data) every x times a request is received (where x may be any number that is one or greater, and may be predefined). In another example, the network cookie may be updated on a time-based basis (e.g., every y hours or days, where y may be any number that is one or greater and may be predefined). In another example, the detection of a triggering event (e.g., the subscriber visiting a specific website at least a predefined number of times within a predefined window of time, a change in the IP address of the user endpoint device, and/or other events) may cause the processing system to update the network cookie. Updating the network cookie may help to ensure that the content delivered to a user endpoint device continues to be well-tailored to the subscriber's evolving intentions and preferences.

In further examples, the network cookie could be used to optimize routing of requests (e.g., DNS requests) from the user endpoint device. For instance, the network cookie may indicate user preferences regarding routing, as well as information about network conditions (e.g., bandwidth, latency, etc.) experienced by the user endpoint device which may enable the ISP to make routing decisions that improve the subscriber experience.

Moreover, the methods 200, 300, and 400 may be performed in a manner that is transparent to the subscriber. That is, the methods 200, 300, and 400 may ensure that the subscriber's personal data is provided only to trusted parties (i.e., the Internet service provider, and potentially to trusted Internet content providers), and only in a manner that is approved by the subscriber, without requiring subscriber intervention (e.g., without requiring the subscriber approve sharing of the subscriber's data each time an Internet content provider requests the subscriber's data).

In some examples, Internet content providers may subscribe to a service that delivers content provided by the Internet content provider to user endpoint devices in response to the detection of certain data in network cookies. For instance, referring again to the example in which the network cookie indicates that the subscriber has viewed a plurality of websites for different luxury car manufacturers, a particular luxury car manufacturer may subscribe to a service through which specific content provided by the particular luxury car manufacturer (e.g., a competitive vehicle offer) may be delivered to the user endpoint device when another request is received from the user endpoint device for an IP address or a URL associated with luxury cars.

It should be noted that the methods 200, 300, and 400 may be expanded to include additional steps or may be modified to include additional operations with respect to the steps outlined above. In addition, although not specifically specified, one or more steps, functions, or operations of the methods 200, 300, and 400 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2, 3, or 4 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 5 depicts a high-level block diagram of a computing device or processing system specifically programmed to perform the functions described herein. As depicted in FIG. 5, the processing system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for providing subscribers of an Internet service provider with customized content via a trusted system, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200, 300, or 400 as discussed above is implemented in a distributed or parallel manner fora particular illustrative example, i.e., the steps of the above method 200, 300, or 400 or the entire method 200, 300, or 400 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200, 300, or 400. In one example, instructions and data for the present module or process 505 for providing subscribers of an Internet service provider with customized content via a trusted system (e.g., a software program comprising computer-executable instructions) can be loaded into memory 504 and executed by hardware processor element 502 to implement the steps, functions, or operations as discussed above in connection with the illustrative method 200, 300, or 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for providing subscribers of an Internet service provider with customized content via a trusted system (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   receiving, by a processing system of a user endpoint device including at least one processor, a network cookie directly from an internet service provider who provides a subscriber who is associated with the user endpoint device with connectivity to the internet;
   storing, by the processing system, the network cookie in a local memory of the user endpoint device;
   generating, by the processing system, a request to send to the internet service provider, wherein the request comprises a request for an internet protocol address associated with a uniform resource locator of an internet content provider;
   attaching, by the processing system, the network cookie to the request; and
   sending, by the processing system, the request and the network cookie to the internet service provider, wherein the network cookie encodes a pattern that is extracted by the internet service provider from a plurality of requests sent by the processing system to the internet service provider prior to the request.

2. The method of claim 1, wherein the network cookie is received along with a response to a domain name system request that the processing system sent to a domain name system resolver.

3. The method of claim 1, wherein the network cookie further encodes information about the subscriber that is stored in a profile for the subscriber that is maintained by the internet service provider.

4. The method of claim 3, wherein the information about the subscriber comprises at least one of: a name of the subscriber, an identifier of the subscriber, an address of the subscriber, a mobile device number associated with the subscriber, a location of the subscriber, or demographic information of the subscriber.

5. The method of claim 4, wherein the profile for the subscriber further defines, for each internet content provider of a defined plurality of internet content providers, a respective subset of the information about the subscriber that is allowed to be shared.

6. The method of claim 5, wherein a first subset of the information about the subscriber that is allowed to be shared with a first internet content provider of the defined plurality of internet content providers is different than a second subset of the information about the subscriber that is allowed to be shared with a second internet content provider of the defined plurality of internet content providers.

7. The method of claim 3, wherein an internet protocol address of the user endpoint device changes from a first internet protocol address to a second internet protocol address, and wherein the network cookie maps the profile for the subscriber to the second internet protocol address.

8. The method of claim 1, wherein the internet content provider comprises an operator of a website.

9. The method of claim 1, wherein the network cookie is stored in a folder or subfolder of a web browser application of the user endpoint device.

10. The method of claim 1, further comprising:
    receiving, by the processing system in response to the request, customized content from the internet service provider.

11. The method of claim 1, further comprising:
    receiving, by the processing system in response to the request, customized content from the internet content provider.

12. A non-transitory computer-readable medium storing instructions which, when executed by a processing system of a user endpoint device including at least one processor, cause the processing system to perform operations, the operations comprising:
    receiving a network cookie directly from an internet service provider who provides a subscriber who is associated with the user endpoint device with connectivity to the internet;
    storing the network cookie in a local memory of the user endpoint device;

generating a request to send to the internet service provider, wherein the request comprises a request for an internet protocol address associated with a uniform resource locator of an internet content provider;

attaching the network cookie to the request; and sending the request and the network cookie to the internet service provider, wherein the network cookie encodes a pattern that is extracted by the internet service provider from a plurality of requests sent by the processing system to the internet service provider prior to the request.

13. The non-transitory computer-readable medium of claim 12, wherein the network cookie is received along with a response to a domain name system request that the processing system sent to a domain name system resolver.

14. The non-transitory computer-readable medium of claim 12, wherein the network cookie further encodes at least one of: a name of the subscriber, an identifier of the subscriber, an address of the subscriber, a mobile device number associated with the subscriber, a location of the subscriber, or demographic information of the subscriber.

15. The non-transitory computer-readable medium of claim 12, wherein the network cookie is stored in a folder or subfolder of a web browser application of the user endpoint device.

16. The non-transitory computer-readable medium of claim 12, wherein the operations further comprise:

receiving, in response to the request, customized content from the internet service provider.

17. The non-transitory computer-readable medium of claim 12, wherein the operations further comprise:

receiving, in response to the request, customized content from the internet content provider.

18. A user endpoint device comprising:

a processing system including at least one processor; and a non-transitory computer-readable medium storing instructions which, when executed by the processing system, cause the processing system to perform operations, the operations comprising:

receiving a network cookie directly from an internet service provider who provides a subscriber who is associated with the user endpoint device with connectivity to the internet;

storing the network cookie in a local memory of the user endpoint device;

generating a request to send to the internet service provider, wherein the request comprises a request for an internet protocol address associated with a uniform resource locator of an internet content provider;

attaching the network cookie to the request; and sending the request and the network cookie to the internet service provider, wherein the network cookie encodes a pattern that is extracted by the internet service provider from a plurality of requests sent by the processing system to the internet service provider prior to the request.

19. The user endpoint device of claim 18, wherein the operations further comprise:

receiving, in response to the request, customized content from the internet service provider.

20. The user endpoint device of claim 18, wherein the operations further comprise:

receiving, in response to the request, customized content from the internet content provider.

\* \* \* \* \*